US005144331A

United States Patent [19]

Amano

[11] Patent Number: 5,144,331

[45] Date of Patent: Sep. 1, 1992

[54] DRIVE CONTROL METHOD FOR THERMAL TRANSFER PRINTER

[75] Inventor: Toshiaki Amano, Iwate, Japan

[73] Assignee: Alps Electric Co., Ltd., Tokyo, Japan

[21] Appl. No.: 731,841

[22] Filed: Jul. 15, 1991

[30] Foreign Application Priority Data

Aug. 20, 1990 [JP] Japan ........ 2-219813

[51] Int. Cl.[5] ........ G01D 9/00; G01D 15/00; B41J 2/325

[52] U.S. Cl. ........ 346/1.1; 346/76 PH; 400/120; 400/237; 400/240; 400/240.2; 400/240.3; 400/240.4

[58] Field of Search ........ 400/237, 237 E, 240, 400/240.2, 240.3, 240.4, 120; 346/76 PH, 1.1

[56] References Cited

U.S. PATENT DOCUMENTS 4,687,359 8/1987 Barrus et al. ........ 400/240.4
4,890,120 12/1989 Sasaki et al. ........ 346/76 PH
4,925,324 5/1990 Ichisawa ........ 400/240.3

FOREIGN PATENT DOCUMENTS 0189574 8/1986 European Pat. Off. ........ 400/237 E

*Primary Examiner*—Benjamin R. Fuller
*Assistant Examiner*—Huan Tran
*Attorney, Agent, or Firm*—Guy W. Shoup; David W. Heid

[57] ABSTRACT

A drive control method for a thermal transfer printer adapted to carry out printing by melting a thermofusible ink of an ink ribbon and transferring the molten ink onto a printing paper. The ink ribbon is formed with a blank portion coated with no ink, which blank portion is formed between an ink layer and a mark for indicating the ink layer. Under the condition where the thermal head is spaced from the printing paper, the ink ribbon is moved to bring the blank portion into opposition to the thermal head. At this position, the thermal head is pressed through the blank portion against the printing paper. Then, the thermal head is moved relative to the printing paper and the ink layer, and simultaneously the thermal head is heated to transfer the ink of the ink layer onto the printing paper. According to this drive control method, no ink is transferred onto the printing paper upon pressing the thermal head through the ink ribbon against the printing paper, thereby preventing staining of the printing paper due to the ink.

4 Claims, 1 Drawing Sheet

DRIVE CONTROL METHOD FOR THERMAL TRANSFER PRINTER

BACKGROUND OF THE INVENTION

1. Field of the Invention

The present inveniton relates to a drive control method for a thermal transfer printer adapted to carry out printing by melting a thermofusible ink of an ink ribbon by means of a thermal head and transferring the molten ink of the ink ribbon onto a printing paper. More particularly, the present invention relates to a drive control method for a thermal transfer printer adapted to carry out printing by using a color ink ribbon called a multicolor ribbon on which a plurality of ink layers having different colors are formed.

2. Description of the Prior Art

Referring to FIG. 2 which shows an example of a general thermal transfer printer, reference numeral 1 generally designates a frame of the thermal transfer printer. The frame 1 is provided at its substantially central portion with a flat platen 2 having a substantially vertical printing surface. A carriage shaft 3 is located before and under the platen 2 so as to extend along the platen 2 in parallel relationship thereto. A front end of the frame 1 is formed into a flanged carriage guide 4. An inside edge of the carriage guide 4 is formed into a rack 5. A carriage 6 is mounted on the carriage shaft 3 and the carriage guide 4. The reciprocates along the carriage shaft 3 and the carriage guide 4 by a motor driven gear (not shown in FIG. 2) meshing with the rack 5. A thermal head 7 is mounted on a front end of the carriage 6 so as to face the printing surface of the platen 2. A photosensor 28 is provided at a side portion of the carriage 6 for detecting a ribbon end indication mark formed at an end portion of an ink ribbon accommodated in an ink ribbon cassette (not shown) adapted to be mounted on an upper surface of the carriage 6 or detecting plural color indication marks for respectively indicating colors of plural ink layers formed on a color ink ribbon accommodated in an ink ribbon cassette (not shown) adapted to be mounted on the upper surface of the carriage 6.

A paper insert section 8 for admitting a printing paper (not shown) and guiding the same to the front side of the platen 2 is formed behind the platen 2. A plurality of paper feed rollers 9 for feeding the printing paper at a predetermined speed is provided at a front end of the paper insert section 8. A plurality of pressure rollers 10 adapted to be respectively pressed against the paper feed rollers 9 are provided below the paper feed rollers 9. Thus, the printing paper inserted from the paper insert section 8 is held between the paper feed rollers 9 and the pressure rollers 10, and is fed to the front side of the platen 2.

FIG. 3 shows a carriage driving mechanism, a thermal head pressing/releasing mechanism, and ribbon winding mechanism in such a printer as shown in FIG. 2. Referring to FIG. 3, a carriage driving motor 11 is provided in the carriage 6. An output of the carriage driving motor 11 is transmitted through a pinion 12 to a gear 13 meshing with the rack 5. Accordingly, the carriage 6 can be reciprocated along the carriage shaft 3 and the carriage guide 4 by normal rotation and reverse rotation of the carriage driving motor 11.

A thermal head mounting member 14 is pivotably supported at a base end thereof to a fulcrum 15 provided at a fore end portion of the carriage adjacent to the plates 2. The thermal head 7 is mounted on a free end portion of the mounting member 14. A cam follower 17 is pivotably supported at an intermediate portion thereof to a fulcrum 16 provided behind the mounting member 14. One end **17*a* of the cam follower 17 is in contact with the mounting member 14, while the other end 17*b* of the cam follower 17 is in slidable engagement with an endless cam groove 19 of a cam member 18 as a drive member. The cam member 18 is integrally formed with an outer peripheral gear 20. The gear 20 meshes with a transmission gear 21 which in turn meshes with an output pinion 23 of a thermal head actuator motor 22 mounted in the carriage 6. Accordingly, the cam member 18 is rotated by driving the motor 22. The rotation of the cam member 18 is followed by rotation of the cam follower 17. By the rotation of the cam follower 17, the mounting member 14 contacting with the one end 17*a* of the cam follower 17 is moved toward and away from the platen 2. As a result, the thermal head 7 presses the ink ribbon and the printing paper against the platen 2 (this condition will be hereinafter referred to as a head-down condition), or is released from the platen 2** (this condition will be hereinafter referred to as a head-up condition).

Further, an ink ribbon winding bobbin 24 for winding the ink ribbon is provided on the carriage 6, and a motor 25 for driving the ink ribbon winding bobbin 24 is mounted in the carriage 6 independently of the thermal head actuator motor 22. An ink ribbon winding gear 27 is provided in the carriage 6 in coaxial relationship with the winding bobbin 24 through a so-called slip mechanism. The winding gear 27 meshes with a transmission gear 26 which in turn meshes with an output pinion **25*a* of the motor 25. Further, although not shown, there is provided a sensor for detecting the head-down condition or the head-up condition of the thermal head 7. In response to the head-down condition or the head-up condition of the thermal head 7 detected by this sensor, the motor 25** is controlled in operation.

FIG. 4 shows a conventional color ink ribbon to be employed for color printing. Referring to FIG. 4, an elongated color ink ribbon 29 is formed with a plurality of repeating units of ink layers continuously arranged in a longitudinal direction of the ink ribbon 29. Each repeating unit of ink layers consists of yellow (Y), cyan (C) and magenta (M) ink layers. At the boundaries of the adjacent ink layers in each repeating unit, there are formed a plurality of color discrimination marks **29*a*, 29*b* and 29*c* for discriminating the colors Y, C and M. In this example shown in FIG. 4, the colors Y, C and M are discriminated from one another by differentiating the number of bars constituting the color discrimination marks 29*a* to 29*c*. These marks 29*a* and 29*c* are detected by the photosensor 28 mounted on the carriage 6, thereby detecting the colors Y, C and M formed on the color ink ribbon 29** and printing data in a desired color.

Drive control for the above-mentioned thermal transfer printer is carried out in the following manner.

The printing paper is first inserted from the paper insert section 8, and is held between the paper feed rollers 9 and the pressure rollers 10. Under the condition, the paper feed rollers 9 are rotationally driven to thereby feed the printing paper by a predetermined amount in a direction perpendicular to a moving direction of the carriage 6. Then, the ink ribbon winding motor 25 is driven to wind the ink ribbon 29 by an amount such that a desired color ink layer on the ink ribbon 29 comes to a print start position. Then, the thermal head actuator motor 22 is driven to press the thermal head 7 against the platen 2 under a predetermined pressure at a position slightly before the print start position. Under this condition, the carriage driving motor 11 is driven to move the carriage 6 and accordingly move the thermal head 7 toward the print start position. Simultaneously, the ink ribbon winding motor 25 is driven to rotate the winding bobbin 24 and wind the ink ribbon 29, while the thermal head 7 is driven according to a desired recording signal, thereby obtaining a desired color print on the printing paper.

In the case that the color is intended to be changed into a different color during the printing of one line, the movement of the carriage 6 is stopped at the end of the printing of the previous color. Then, the thermal head 7 is released from the platen 2. Thereafter, the ink ribbon winding motor 25 is driven again to rotate the winding bobbin 24 until a color discrimination mark corresponding to a is detected by means of the photosensor 28. When a desired color ink layer comes to a position opposed to the thermal head 7, the motor 25 is stopped. Then, the thermal head 7 is again pressed against the platen 2, and the carriage 6 is moved together with the thermal head 7 to a next print start position. Subsequently, the same printing operation as mentioned above is carried out for the current desired color. After the printing of the current one line is terminate, the carriage 6 is returned to an initial position in the next line to be printed. In this case, the paper feed rollers 9 are rotated to feed the printing paper by the predetermined amount simultaneously with the return operation of the carriage 6. However, in the case of printing the next data over previously printed data in the same line in different colors, the paper feeding operation is not carried out but only the return operation of the carriage 6 is carried out.

However, upon pressing the thermal head 7 against the platen 2 under a predetermined pressure with the printing paper and the ink ribbon 29 spaced from the platen 2, the ink of the ink ribbon is unnecessarily transferred onto the printing paper at the position slightly before the print start position. That is, at the position where the thermal head 7 is pressed, the ink layer of the ink ribbon 29 is present, causing unwanted transfer of the ink onto the printing paper at the head pressing position by the impact of the thermal head 7. As a result, the printing paper is stained with the ink transferred. Particularly, in the case that the printing paper is a wood-free paper having a smooth surface, such unwanted transfer of the ink at the head pressing position is considerably.

SUMMARY OF THE INVENTION

It is accordingly an object of the present invention to provide a drive control method for a thermal transfer printer which can eliminate undue transfer of ink onto a printing paper upon pressing a thermal head against the printing paper. thereby achieving a desirable print.

According to the present invention, there is provided a drive control method for a thermal transfer printer adapted to carry out printing by detecting a mark formed upstream or downstream of an ink layer on an elongated ink medium for indicating the ink layer, and pressing a thermal head through the ink medium against a printing paper to transfer ink of the ink layer onto the printing paper by heat; said drive control method comprising the steps of moving said ink medium spaced from said printing paper so as to bring a blank portion formed between said mark and said ink layer into opposition to said thermal head, said blank portion being coated with no ink; pressing said thermal head through said blank portion against said printing paper to bring said thermal head into pressure contact with said blank portion and said printing paper; and moving said thermal head relative to said printing paper, and simultaneously heating said thermal head to transfer the ink of said ink layer onto said printing paper.

As mentioned above, before pressing the thermal head against the printing paper, the blank portion of the ink medium formed between the mark and the ink layer is brought into opposition to the thermal head. At this position, the thermal head is pressed through the blank portion against the printing paper. Accordingly, no ink is transferred onto the printing paper at the head/down position where the thermal head comes into pressure contact with the ink medium and the printing paper.

Other objects and features of the invention will be more fully understood from the following detailed description and appended claims when taken with the accompanying drawings.

DETAILED DESCRIPTION OF THE PREFERRED EMBODIMENTS

Figure 2:
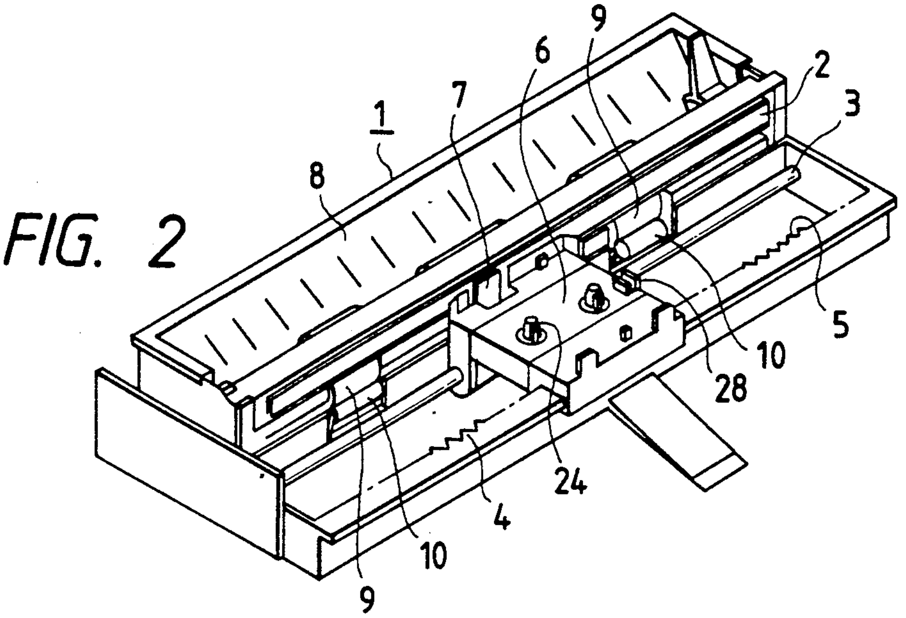
FIG. 2 is a perspective view of the thermal transfer printer in the prior art.
Figure 3:
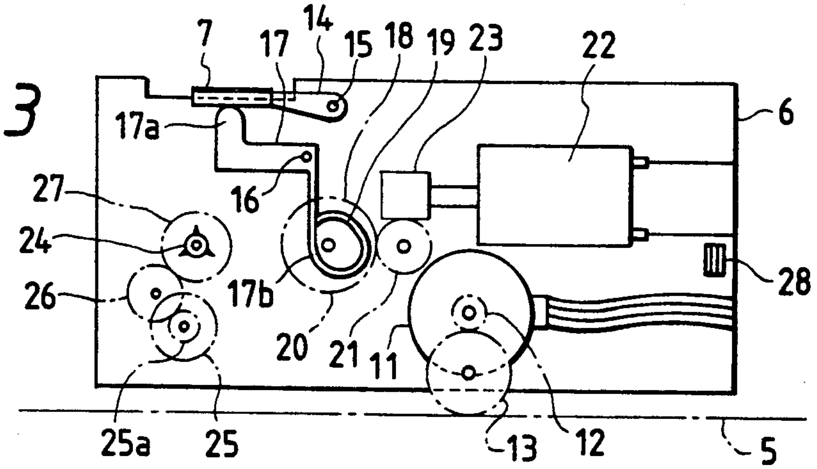
FIG. 3 is a schematic illustration of the thermal head actuator mechanism, the carriage driving mechanism, and the ink ribbon winding mechanism is the thermal transfer printer shown in FIG. 2.
Figure 4:
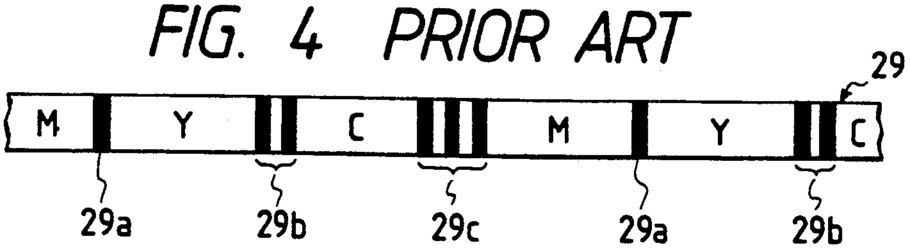
FIG. 4 PRIOR ART
FIG. 4 is a view similar to FIG. 1, showing the ink ribbon in the prior art.

A preferred embodiment of the drive control method for the thermal transfer printer according to the present invention will now be described with reference to FIGS. 1 to 3.

Figure 1:
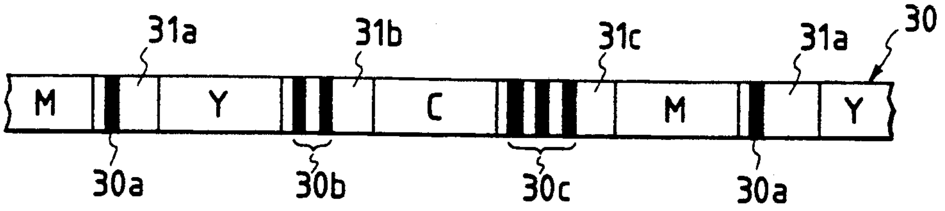
FIG. 1 is an enlarged plan view of an essential part of the ink ribbon to be employed in carrying out the drive control method for the thermal transfer printer according to the present invention.

FIG. 1 is an enlarged plan view of an essential part of a color ink ribbon 30 to be employed as an example of an elongated ink medium in carrying out the preferred embodiment. Referring to FIG. 1, the elongated color ink ribbon 30 is formed with a plurality of repeating units of ink layers continuously arranged in a longitudinal direction of the ribbon 30. Each repeating unit of ink layers consists of yellow (Y), cyan (C) and magenta (M) ink layers. At the boundries of the adjacent ink layers in each repeating unit, there are formed a plurality of color discrimination marks **30*a*, 30*b* and 30*c* for discriminating the colors Y, C and M. In this preferred embodiment, the colors Y, C and M are discriminated from one another by differentiating the number of bars constituting the color discrimination marks 30*a* to 30*c*. Further, there is formed between the mark 30*a* and the yellow (Y) ink layer corresponding thereto a blank portion 31*a* coated with no ink. Similarly, a blank portion 31*b* coated with no ink is formed between the mark 30*b* and the cyan (C) ink layer corresponding thereto, and a blank portion 31*c* coated with no ink is formed between the mark 30*c*** and the magneta (M) ink layer corresponding thereto.

The operation of the preferred embodiment using the ink ribbon 30 will be described with reference to FIGS. 2 and 3.

Under the condition where the ink ribbon 30 is spaced from the printing paper and the platen 2, the carriage is moved so as to bring the thermal head 7 into opposition to a position slightly upstream of a printing area. Then, the ink ribbon winding motor 25 is driven to rotate the winding bobbin 24 and thereby wind the ink ribbon 30, so as to detect the mark corresponding to a desired color for printed, e.g., the mark 30*a* corresponding to the yellow (Y) ink layer by means of the photosensor 28. Then, the winding bobbin 24 is further rotated by a predetermined amount to wind the ink ribbon 30 until the blank portion 31*a* formed between the mark 30*a* and the yellow (Y) ink layer is brought into opposition to the thermal head 7. Under the condition, the thermal head activator motor 22 is driven to press the thermal head 7 against the printing paper and the platen 2 under a predetermined pressure. According to this preferred embodiment, since the thermal head 7 at the head-down position is opposed to the blank portion 31*a* just upstream of the yellow (Y) ink layer with the printing paper interposed therebetween. Therefore, no ink is transferred onto the printing paper at the head-down position. Thereafter, the carriage driving motor 11 and the ink ribbon winding motor 25 are driven to simultaneously carry out the movement of the thermal head 7 in the printing direction and the winding of the ink ribbon 30. During this simultaneous operation, current to be supplied to heat generating elements of the thermal 7 is controlled according to a recording signal to thereby selectively heat the heat generating elements. As a result, the ink of the yellow (Y) ink layer is transferred onto the printing paper at a predetermined printing position.

In the case that the color is intended to be changed into a different color, e.g., the cyan (C) during the printing of one line, the thermal head 7 is released from the platen 2 after ending the printing of the one line in the color of yellow (Y). Then, the carriage 6 is moved backward to return the thermal head 7 to a position slightly upstream of the printing area or a position slightly upstream of a print start position for the printing in the color of cyan (C) in the same line. Then, ink ribbon winding bobbin 24 is rotated to wind the ink ribbon 30 until the mark 30*b* corresponding to the cyan (C) ink layer is detected by the photosensor 28, and the blank portion 31*b* is then brought into opposition to the thermal head 7. Thereafter, the printing operation is carried out in the same manner as that for the color of yellow (Y).

After thus ending the printing of the one line in all of the colors, i.e., the yellow (Y), cyan (C) and magenta (M), the printing paper is fed by a desired amount by means of the paper feed rollers 9 and the pressure rollers 10 to print data in the next line in the same manner as above.

Although the ink ribbon 30 employed in the above preferred embodiment has a width substantially equal to a height of one line to be printed, the width of the ink ribbon may be increased as required. Further, it is noted that the drive contrl method of the present invention may be applied to a thermal transfer printer employing an ink sheet having a width equal to a length of one line to printed and a line thermal printer having a length equal to the length of one line.

Further, the color ink ribbon 30 employed in the above preferred embodiment may be replaced by a single-color ink ribbon. In this case, a plurality of blank portions coated with no ink and a plurality of blank portion indication marks to be detected by the photosensor are formed on ink ribbon in a longitudinal direction thereof at predetermined intervals. Similarly to the case of using the color ink ribbon, the thermal head is brought into opposition to one of the blank portions, and is then pressed against the platen in this position, thereby preventing undue transfer of ink onto the printing paper at the head-down position.

As described above, no ink is transferred from the ink ribbon onto the printing at the head-down position, thereby obtaining a desirable print.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A drive control method for a thermal transfer printer adapted to carry out printing by detecting a mark formed on an elongated ink medium for indicating an ink layer formed on said ink medium, and pressing a thermal head through the ink medium against a printing paper to transfer the ink layer onto the printing paper by heat; said drive control method comprising the steps of:

moving said ink medium spaced from said printing paper so as to bring a blank portion formed between said mark and said ink layer into opposition to said thermal head, said blank portion being coated with no ink;

pressing said thermal head through said blank portion against said printing paper to bring said thermal head into pressure contact with said blank portion and said printing paper; and moving said thermal head relative to said printing paper, and simultaneously heating said thermal head to transfer the ink of said ink layer onto said printing paper.

2. The drive control method as defined in claim 1, wherein said ink medium is in a shape of an ink ribbon.

3. The drive control method as defined in claim 1, wherein said ink medium is in a shape of an ink sheet.

4. The drive control method as defined in claim 1, wherein said ink medium comprises a plurality of repeating units continuously arranged, each of said repeating units consisting of multicolor ink layers, each of said ink layers having a predetermined length.

* * * * *